(12) United States Patent
Martin

(10) Patent No.: US 7,946,532 B2
(45) Date of Patent: May 24, 2011

(54) FURNITURE UNIT FOR A VEHICLE, ESPECIALLY AN AIRCRAFT

(75) Inventor: Gabriel Martin, Echillais (FR)

(73) Assignee: EADS Sogerma Services, Merignac (FR)

( * ) Notice: Subject to any disclaimer, the term of this patent is extended or adjusted under 35 U.S.C. 154(b) by 503 days.

(21) Appl. No.: 11/391,460

(22) Filed: Mar. 29, 2006

(65) Prior Publication Data
US 2006/0219843 A1 Oct. 5, 2006

(30) Foreign Application Priority Data

Mar. 31, 2005 (FR) ...................................... 05 03127

(51) Int. Cl.
B64D 11/06 (2006.01)
(52) U.S. Cl. .................................. 244/122 R; 244/118.6
(58) Field of Classification Search .................. 105/314, 105/315, 344; 244/118.6, 118.5, 122 R; 297/118, 232, 248, 249, 311.45, 411.3, 423.12, 297/423.26
See application file for complete search history.

(56) References Cited

U.S. PATENT DOCUMENTS

| 55,448 | A | * | 6/1866 | Allen | 105/315 |
|---|---|---|---|---|---|
| 1,036,038 | A | * | 8/1912 | Vosler | 105/315 |
| 2,583,960 | A | * | 1/1952 | Murphy | 105/315 |
| 4,046,421 | A | * | 9/1977 | Spound et al. | 297/232 |
| 4,184,656 | A | * | 1/1980 | Wakeley | 244/118.6 |
| 4,685,719 | A | * | 8/1987 | Hanemaayer | 296/156 |
| 5,267,776 | A | * | 12/1993 | Fromson | 297/232 |
| 6,000,659 | A | * | 12/1999 | Brauer | 244/118.6 |
| 6,155,519 | A | * | 12/2000 | Rajasingham | 244/118.6 |
| 6,398,164 | B1 | * | 6/2002 | Fasse | 244/118.6 |
| 6,616,098 | B2 | * | 9/2003 | Mills | 244/118.5 |
| 6,669,141 | B2 | * | 12/2003 | Schmidt-Schaeffer | 244/118.6 |
| 7,156,344 | B1 | * | 1/2007 | Guering | 244/118.5 |
| 7,185,849 | B2 | * | 3/2007 | Ferry et al. | 244/118.6 |
| 7,360,742 | B2 | * | 4/2008 | Beroth | 244/118.5 |
| 2002/0070314 | A1 | | 6/2002 | Schmidt-Schaeffer | |
| 2003/0218095 | A1 | * | 11/2003 | Saint Jalmes | 244/118.5 |
| 2004/0232283 | A1 | * | 11/2004 | Ferry et al. | 244/118.6 |
| 2005/0001097 | A1 | * | 1/2005 | Saint-Jalmes | 244/118.6 |
| 2005/0001098 | A1 | * | 1/2005 | Saint-Jalmes | 244/118.6 |
| 2007/0080566 | A1 | * | 4/2007 | Ferry et al. | 297/248 |
| 2007/0102577 | A1 | * | 5/2007 | Saint-Jalmes et al. | 244/118.6 |
| 2007/0145187 | A1 | * | 6/2007 | Beroth | 244/118.6 |
| 2007/0164157 | A1 | * | 7/2007 | Park | 244/118.6 |
| 2007/0210209 | A1 | * | 9/2007 | Saint-Jalmes et al. | 244/119 |
| 2009/0146006 | A1 | * | 6/2009 | Park et al. | 244/118.6 |

OTHER PUBLICATIONS

Preliminary Search Report dated Dec. 8, 2005 with English translation.

* cited by examiner

Primary Examiner — Timothy D Collins
Assistant Examiner — Brian M O'Hara
(74) Attorney, Agent, or Firm — Dickinson Wright PLLC

(57) ABSTRACT

A furniture unit for a vehicle includes a seat having a side that is joined permanently to a couch. The general direction of the couch is angled, forwards of the seat, with respect to the direction in which the seat faces. A squab of the seat and a squab of the couch are located at the same level, in such a way as to form a surface suitable for use as a bed.

15 Claims, 3 Drawing Sheets

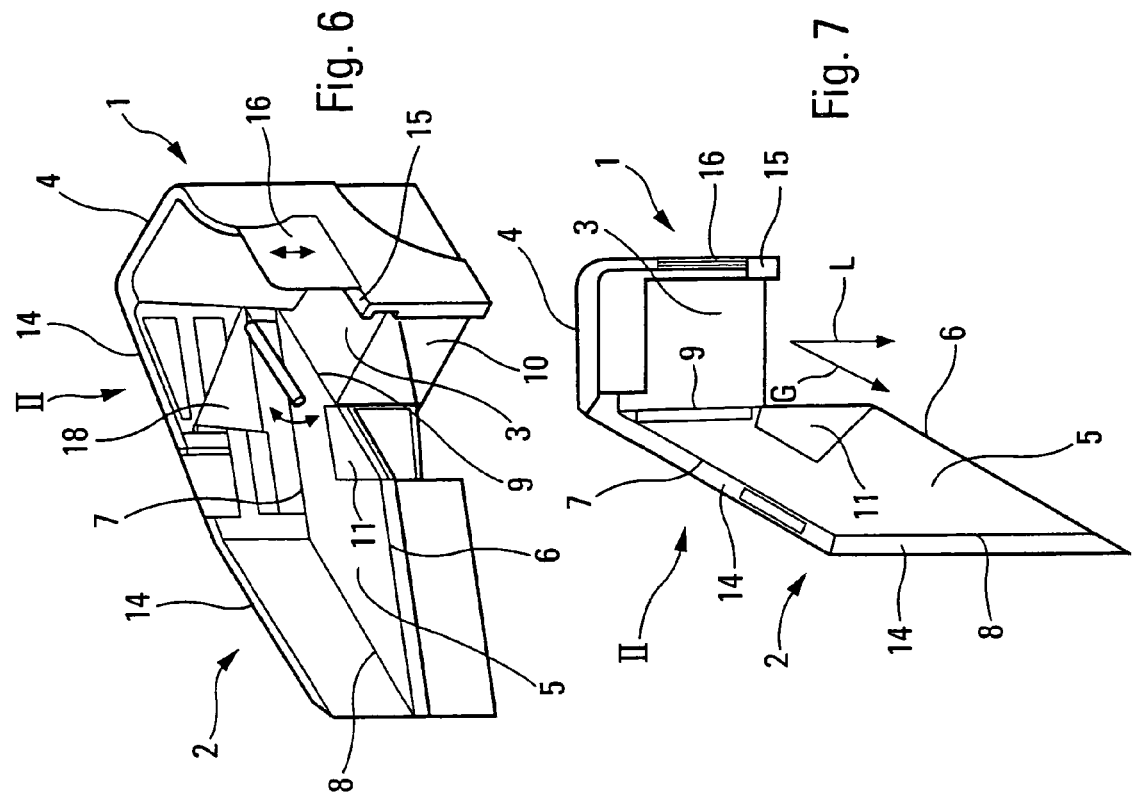
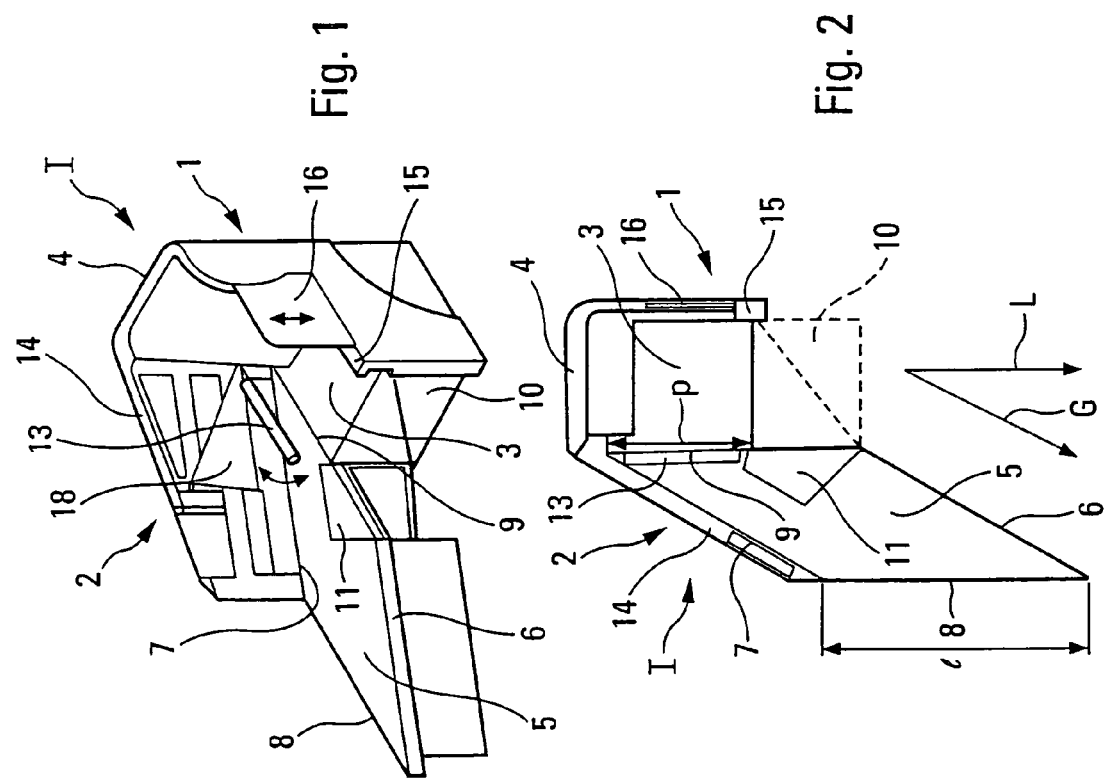

FURNITURE UNIT FOR A VEHICLE, ESPECIALLY AN AIRCRAFT

FIELD OF THE INVENTION

The present invention relates to a furniture unit for a vehicle, especially an aircraft, and to a layout for a plurality of identical such furniture units.

BACKGROUND OF THE RELATED ART

As is known, in a vehicle, the passengers sit in seats arranged in longitudinal columns and transverse rows. When the vehicle is set up for long trips, said seats may optionally be convertible into beds to improve the comfort of passengers by allowing them to lie down. However, where this is done, the rows of seats must be widely separated from each other (by around two meters) to allow said convertible seats to be opened out in the longitudinal direction. This greatly reduces the number of seats available in the vehicle.

SUMMARY OF THE INVENTION

It is an object of the present invention to overcome this problem by making it possible for at least some passengers of a vehicle to lie down without requiring an excessive reduction in the number of seats available in said vehicle.

For this purpose, according to the invention, the furniture unit for a vehicle, especially an aircraft, is noteworthy in that:
  it comprises a seat and, joined securely to the side of said seat, a couch;
  the general direction of said couch is angled towards the front of said seat with respect to the direction in which the seat faces; and
  the squab of said seat and the squab of said couch are located at the same level, in such a way as to form a surface suitable for use as a bed.

Consequently, because of the fact that, on the one hand, the couch is angled and, on the other, that the surface acting as the bed is obtained without tilting the seat backrest back, the spacing between two successive rows of furniture units in accordance with the present invention can be reduced considerably. In the layouts described below, therefore, such spacing need be only of about one meter (which is some 50% less than with the convertible seats mentioned above).

As will be seen later, one advantageous embodiment of the furniture unit of the invention (as regards the amount of space required for a layout of a plurality of such furniture units) is noteworthy in that the squab of said couch is in the shape of a parallelogram defined by a front longitudinal edge and a rear longitudinal edge, both being angled with respect to said direction in which said seat is facing, and by a distal transverse edge and a proximal transverse edge, both parallel to said direction, said couch being joined to said seat by its proximal transverse edge.

Said parallelogram is preferably a lozenge.

Said proximal transverse edge of the squab of said couch may have a length greater than the depth of the squab of said seat.

In this case, in order to increase the surface area of the bed without increasing the space taken up by the furniture unit in accordance with the present invention, it is advantageous that said seat comprises a retractable movable part capable of augmenting the squab of said seat at the front by giving it a depth approximately equal to or greater than said length of said proximal transverse edge.

This movable part is preferably able to form a leg rest for said seat.

To allow the passenger to sit down in order easily to enter or leave said furniture unit, it is preferable for said movable part to comprise two elements hinged together, one being an inner element and hinged to said seat, and the other being an outer element and being able to be folded up independently of the inner element.

Again, it is advantageous that the squab of said couch comprises, in its proximal transverse edge, forward of said seat, a retractable part capable of forming a recess in said proximal transverse edge. Thus, when a person visits the passenger occupying said furniture unit, the visitor can sit comfortably on the couch with his or her legs in said recess, without being too close to the passenger sitting in the seat.

The seat of the furniture unit in accordance with the present invention may have an armrest next to said couch. However, this armrest is advantageously retractable so as to allow access to said surface suitable for use as a bed.

For the purpose of isolating the passenger occupying said furniture unit from his environment, said unit may have a side wall forming an external extension of the backrest of said seat which follows the rear longitudinal edge of the squab of said couch and projects upward from said squab.

Said side wall may moreover follow the distal transverse edge of said squab. Also, the seat may house, in its armrest located on the side away from the couch, a movable plate of, for example, smoked glass, that can adopt a position of deployment in which it projects above said armrest.

In order to fit out the interior of a vehicle, e.g. a passenger cabin in an aircraft, it is possible to provide, in accordance with the present invention, a layout noteworthy in that:
  it comprises a plurality of identical furniture units as described above; and
  said furniture units are arranged in column one behind the other, with the seats all facing the front of said vehicle and the couches all positioned on the same side of said seats.

For an optimal reduction in the space requirements of such a layout, said furniture units may interlock in such a way that the front longitudinal edge of the squab of the couch of one of the furniture units of the column fits against the rear longitudinal edge of the squab of the couch of the furniture unit in front. The distal transverse edges of the squabs of the couches of the column are therefore in line with each other.

In this way, two consecutive furniture units in said column can define between themselves a cubicle closed by the backrests of the seats and the side walls of the couches, and optionally by a surface (the fuselage, an internal partition, etc.) belonging to said vehicle and supplementing said side walls.

Each passenger thus has a private partitioned compartment within said vehicle.

Clearly, depending on such things as the position of the furniture units within the vehicle, the side couch of these units can be on either side of the seat.

BRIEF DESCRIPTION OF THE DRAWINGS

The figures of the accompanying drawing will show clearly how the invention can be put into practice. In these figures, identical references denote similar parts.

FIG. 1 shows schematically, in perspective from above and from the front, a first example of a furniture unit in accordance with the present invention.

FIG. 2 is a schematic top view of the furniture unit of FIG. 1.

FIG. 6 shows schematically, in a perspective view from above and from the front, a second example of a furniture unit in accordance with the present invention.

FIG. 7 is a schematic top view of the furniture unit of FIG. 6.

DETAILED DESCRIPTION OF THE INVENTION

Figure 3:
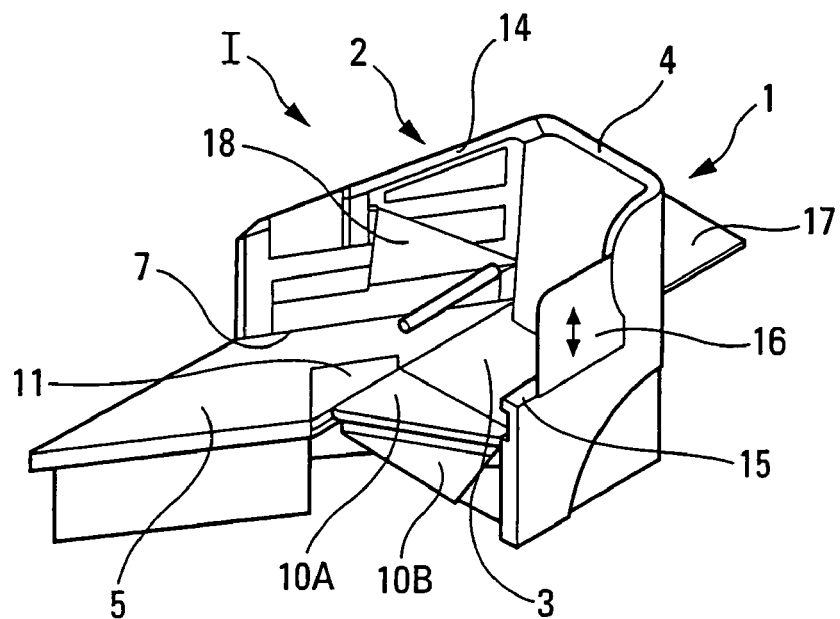
FIG. 3 shows, in a view similar to FIG. 1, details of the furniture unit in accordance with the present invention.
Figure 4:
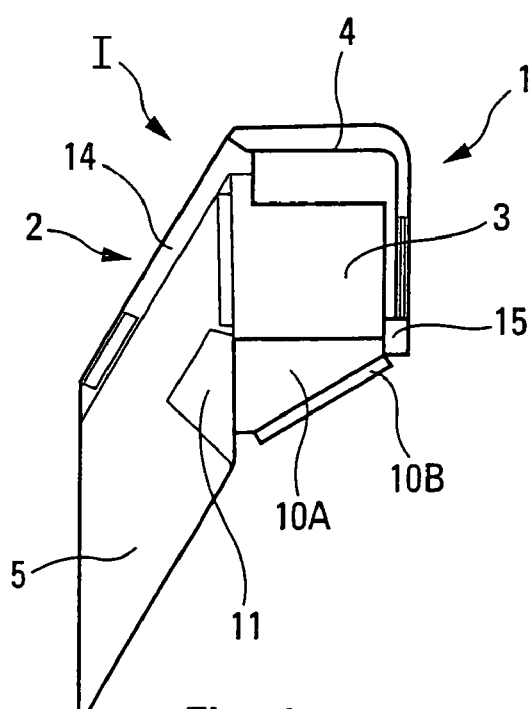
FIG. 4 is a schematic top view of the furniture unit shown in FIG. 3.

The furniture unit I for a vehicle, particularly an aircraft, shown in FIGS. 1 and 2, comprises a seat 1 and an integral couch 2.

The couch 2 is joined to the side of the seat 1 and its general direction G is angled, forwards of said seat 1, with respect to the direction L in which the seat faces.

The seat 1 comprises a squab 3 and a backrest 4. The angled couch 2 comprises a squab 5 bounded by a front longitudinal edge 6, a rear longitudinal edge 7, a distal transverse edge 8 and a proximal transverse edge 9. The edges 6 to 9 give said squab 5 a lozenge shape. The couch 2 is joined to the seat 1 along its proximal transverse edge 9.

The squab 3 of the seat 1 and the squab 5 of the couch 2 are located at the same level to form a continuous surface 3, 5 suitable for use as a bed.

The front longitudinal edge 6 and the rear longitudinal edge 7 are angled parallel to the general direction G and the distal transverse edge 8 and the proximal transverse edge 9 are parallel to the direction L.

Figure 5:
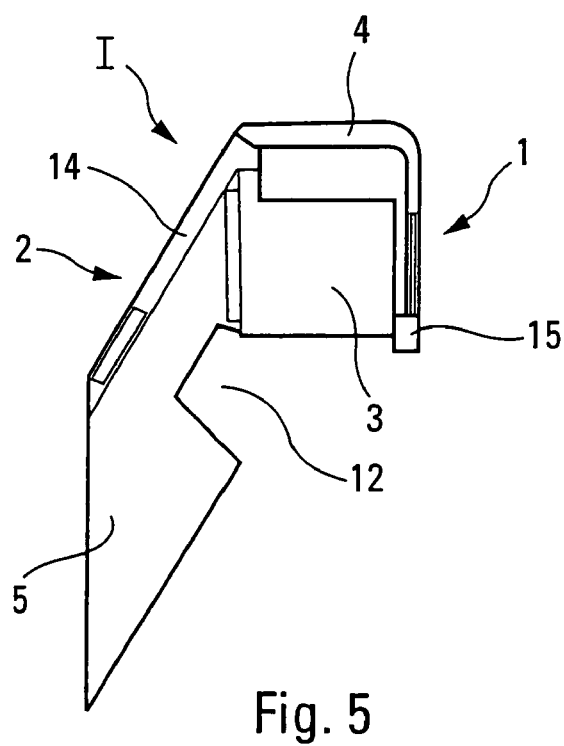
FIG. 5 corresponds to FIG. 2 and shows the retraction of a movable part of the couch of the corresponding furniture unit.

The distal 8 and proximal 9 transverse edges have a length l greater than the depth p of the squab 3 of the seat 1 and the latter includes a retractable movable part 10 capable of augmenting the squab 3 of the seat 1 in the forward direction by giving it a depth similar to the length of the transverse edges 8 and 9. In FIGS. 1 and 5, the movable part 10 is shown in the retracted position, whereas it is shown in dashes in the deployed position in FIG. 2. In the latter case, it will be seen to complete the surface area of the bed 3, 5 forwards of the seat 1.

The movable part 10 can also occupy a downward sloping position (not shown in the figures) to serve as a leg rest for the seat 1.

On the other hand, FIGS. 1, 2, 3 and 4 show that the movable part 10 is composed of an inner element 10A and an outer element 10B hinged together. The inner element 10A is hinged to the seat 1, while the outer element 10B can be folded away independently of the inner element 10A (see FIGS. 3 and 4).

Additionally, the couch 2 comprises in its proximal transverse edge 9, forward of the squab 3, a retractable part 11 capable of forming a recess 12 in said proximal transverse edge 9. Said recess 12 (see FIG. 5) may be adjacent to the squab 3.

The seat 1 has a retractable armrest 13 next to the couch 2.

Furthermore, the couch 2 comprises a side wall 14 by way of an external continuation of the backrest 4 of the seat 1 which follows the rear longitudinal edge 7 of the squab 5 of said couch 2 and projects upward away from said squab 5.

On the side away from the couch 2, the seat 1 has an armrest 15 containing a movable plate 16. This movable plate 16 can adopt a deployed position (see FIGS. 1 and 3) projecting above the armrest 15 to isolate the passenger (not shown) on this side when the passenger is sitting in said seat 1.

The furniture unit may include other devices, such as folding tables 17, 18, holders for small objects, larger storage compartments, electrical power sockets, etc. (not numbered).

The variant II shown in FIGS. 6 and 7 of the furniture unit according to the invention includes the elements 1 to 18 described above. However, in this furniture unit II, the projecting wall 14 also extends along the distal transverse edge 8 of the squab 5.

Figure 8:
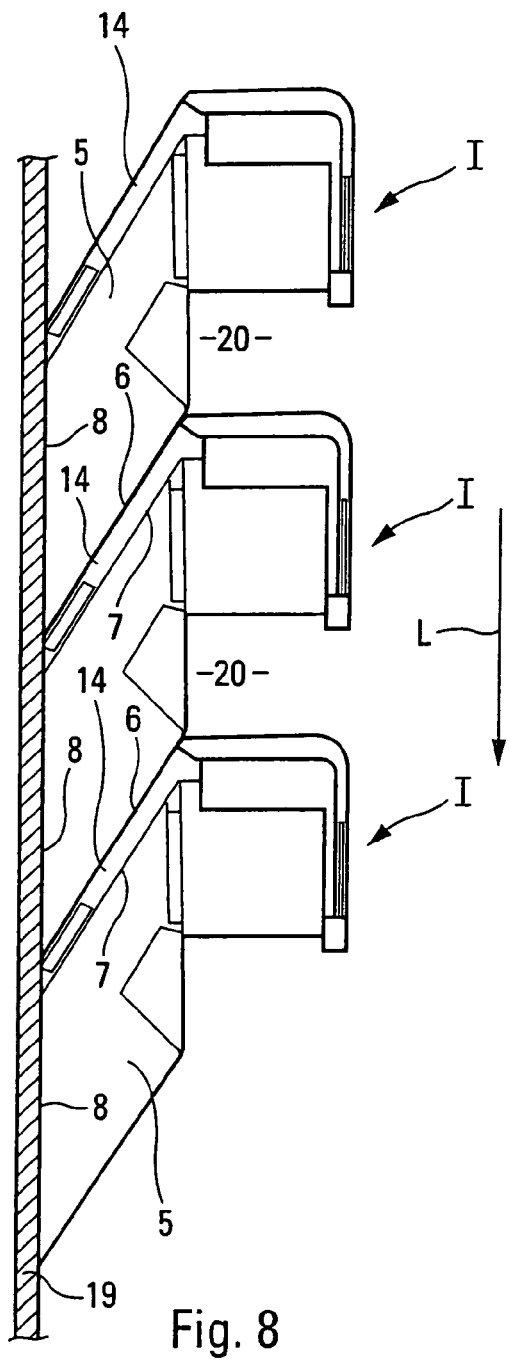
FIG. 8 is a schematic top view of a layout for furniture units such as those shown in FIGS. 1 and 2.

FIG. 8 is a top view of a layout for a plurality of furniture units I in accordance with the present invention. As can be seen in the figure:

the furniture units I are arranged in a column one behind the other, all the seats 1 facing in the same direction L, which may indicate the front of a vehicle, and all the couches 2 are positioned on the same side;

the furniture units I interlock in such a way that the front longitudinal edge 6 of the squab 5 of the couch of one of the units I fits against the rear longitudinal edge 7 of the squab 5 of the unit I in front;

the distal transverse edges 8 of the squabs 5 of the column are in line with each other; and the distal transverse edges 8 are positioned against a surface 19, such as the wall of the cabin of an aircraft.

In this way, the surface 19, the backrests 4 of the seats 1 and the side walls 14 define, between two consecutive furniture units I, a closed cubicle 20, which can be further isolated by using the movable plate 16 situated in the armrest 15.

Figure 9:
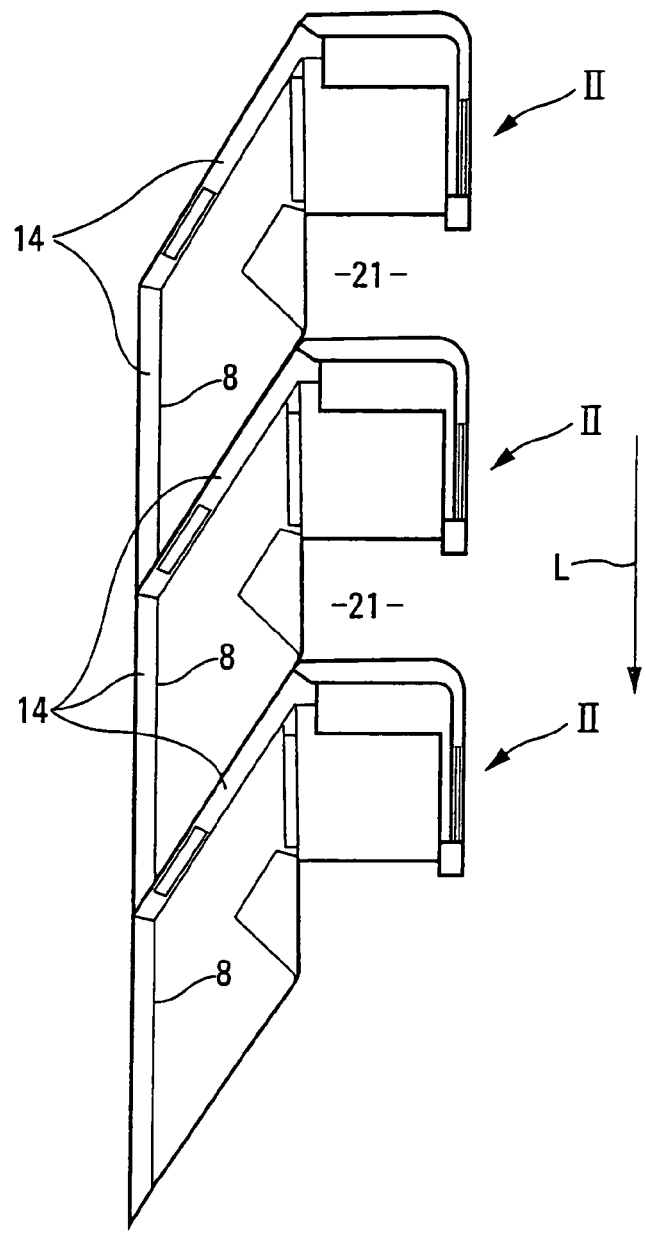
FIG. 9 is a schematic top view of a layout for furniture units such as those shown in FIGS. 6 and 7.

FIG. 9 illustrates a similar layout to that described with reference to FIG. 8, but composed of furniture units II. Here, as the distal transverse edges 8 are also furnished with the projecting wall 14, cubicles 21 can be formed between two consecutive units II without the need for a surface 19.

It will of course be appreciated that, although FIGS. 1 to 9 show the couches 2 arranged on the right-hand side of the seats 1, said couches 2 could be attached to their left-hand side.

It will be observed too that, if the seats 1 have a folding external table 17, then both the passenger sitting in the seat 1 of a cubicle 20 or 21 and his visitor sitting on the squab 5 with his legs in the recess 12 can use said table fitted to the back of the seat in front.

The invention claimed is:

1. A furniture unit in an aircraft which comprises:
   a seat having a front and a backrest; and
   a couch joined permanently and directly to a side of said seat, wherein: the squab of said couch is in the shape of a parallelogram defined by a front longitudinal edge and a rear longitudinal edge, both being angled forwards of said seat, with respect to the direction in which the front of said seat faces, and by a distal transverse edge and a proximal transverse edge, both parallel to said direction, said couch being joined to said seat by its proximal transverse edge; and
   the squab of said seat and the squab of said couch are located at the same level without any gap existing between the squab of said couch and the squab of said seat, in such a way that the squab of said couch and the squab of said seat together form a continuous surface suitable for use as a bed, said continuous surface comprising both a part of the squab of the couch and a part of the squab of the seat.

2. The furniture unit as claimed in claim 1, in which said parallelogram is a lozenge.

3. The furniture unit as claimed in claim 1, in which said proximal transverse edge of the squab of said couch has a length greater than the depth of the squab of said seat and in which said seat comprises a retractable movable part capable of augmenting the squab of said seat at the front by giving it a depth approximately equal to said length of said proximal transverse edge.

4. The furniture unit as claimed in claim 3, in which said movable part is able to form a leg rest for said seat.

5. The furniture unit as claimed in claim 3, in which said movable part comprises two elements hinged together, one being an inner element and hinged to said seat, and the other being an outer element and being able to be folded up independently of the inner element.

6. The furniture unit as claimed in claim 1, in which the squab of said couch comprises, in its proximal transverse edge, forward of the squab of said seat, a retractable part capable of forming a recess in said proximal transverse edge.

7. The furniture unit as claimed in claim 1, in which said seat has a retractable armrest next to said couch.

8. The furniture unit as claimed in claim 1, in which said couch has a side wall forming an external extension of the backrest of said seat which follows the rear longitudinal edge of the squab of said couch and projects upward from said squab.

9. The furniture unit as claimed in claim 8, in which said side wail also follows the distal transverse edge of the squab of said couch.

10. The furniture unit as claimed in claim 1, in which said seat has an armrest on the side away from said couch and in which a movable plate is housed in the latter armrest and can adopt a position of deployment in which it projects above the latter.

11. A furniture layout in an aircraft which:
comprises a plurality of identical furniture units as specified in claim 1; and
said furniture units are arranged in a column one behind the other, with the seats all facing the front of said vehicle and the couches all positioned on the same side of said seats.

12. The furniture layout as claimed in claim 11, in which said furniture units interlock in such a way that the front longitudinal edge of the squab of the couch of one of the furniture units of the column fits against the rear longitudinal edge of the squab of the couch of the furniture unit in front.

13. The furniture layout as claimed in claim 12 wherein said furniture units are such that the squab of said couch is in the shape of a parallelogram defined by a front longitudinal edge and a rear longitudinal edge, both being angled with respect to said direction in which said seat is facing, and by a distal transverse edge and a proximal transverse edge, both parallel to said direction, said couch being joined to said seat by its proximal transverse edge and the distal transverse edges of the squabs of the couches of the column are in line with each other.

14. The furniture layout as claimed in claim 13, wherein said furniture units are such that the squab of said couch is in the shape of a parallelogram defined by a front longitudinal edge and a rear longitudinal edge, both being angled with respect to said direction in which said seat is facing, and by a distal transverse edge and a proximal transverse edge, both parallel to said direction, said couch being joined to said seat by its proximal transverse edge, said couch has a side wall forming an external extension of the backrest of said seat which follows the rear longitudinal edge of the squab of said couch and projects upward from said squab and two consecutive furniture units in said column define between themselves a cubicle closed by the backrests of the seats and the side walls of the couches of said furniture units, and by a surface belonging to said vehicle.

15. The furniture layout as claimed in claim 13 wherein said furniture units are such that that the squab of said couch is in the shape of a parallelogram defined by a front longitudinal edge and a rear longitudinal edge, both being angled with respect to said direction in which said seat is facing, and by a distal transverse edge and a proximal transverse edge, both parallel to said direction, said couch being joined to said seat by its proximal transverse edge, said couch has a side wall forming an external extension of the backrest of said seat which follows the rear longitudinal edge of the squab of said couch and projects upward from said squab, said side wall also follows the distal transverse edge of the squab of said couch and two consecutive furniture units of said column define between themselves a cubicle closed by the backrests of the seats and the side walls of the couches of said furniture units.

* * * * *